United States Patent
Saitou

(10) Patent No.: US 12,227,634 B2
(45) Date of Patent: Feb. 18, 2025

(54) FIBER SHEET AND METHOD FOR PRODUCING SAME

(71) Applicant: Kao Corporation, Tokyo (JP)

(72) Inventor: Kenichi Saitou, Saitama (JP)

(73) Assignee: Kao Corporation, Tokyo (JP)

( * ) Notice: Subject to any disclaimer, the term of this patent is extended or adjusted under 35 U.S.C. 154(b) by 834 days.

(21) Appl. No.: 17/421,443

(22) PCT Filed: Dec. 25, 2019

(86) PCT No.: PCT/JP2019/050930
§ 371 (c)(1),
(2) Date: Jul. 8, 2021

(87) PCT Pub. No.: WO2020/145152
PCT Pub. Date: Jul. 16, 2020

(65) Prior Publication Data
US 2022/0081544 A1   Mar. 17, 2022

(30) Foreign Application Priority Data
Jan. 9, 2019  (JP) ................................ 2019-001866

(51) Int. Cl.
*C08L 23/10* (2006.01)
*A47L 13/17* (2006.01)

(52) U.S. Cl.
CPC .............. *C08L 23/10* (2013.01); *A47L 13/17* (2013.01); *C08L 2203/12* (2013.01); *C08L 2205/242* (2013.01); *C08L 2207/324* (2013.01)

(58) Field of Classification Search
CPC .............. A47L 13/17; C08L 2203/12; C08L 2205/242; C08L 2207/324; C08L 23/10; D04H 1/407; D04H 1/4291; D04H 13/02
See application file for complete search history.

(56) References Cited

U.S. PATENT DOCUMENTS

| | | |
|---|---|---|
| 2002/0034610 A1 | 3/2002 | Perez et al. |
| 2005/0202231 A1 | 9/2005 | Takata et al. |
| | (Continued) | |

FOREIGN PATENT DOCUMENTS

| | | |
|---|---|---|
| JP | 2001-181423 A | 7/2001 |
| JP | 2003-312155 A | 11/2003 |
| | (Continued) | |

OTHER PUBLICATIONS

International Search Report issued Mar. 24, 2020 in PCT/JP2019/050930 filed Dec. 25, 2019, 3 pages.
(Continued)

*Primary Examiner* — Arti Singh-Pandey
(74) *Attorney, Agent, or Firm* — Oblon, McClelland, Maier & Neustadt, L.L.P.

(57) ABSTRACT

A fiber sheet (1) according to the present invention includes a plurality of stem fibers (2) containing a thermoplastic resin and extending in one direction and includes a fibril fiber (3) containing substantially the same thermoplastic resin as the above thermoplastic resin, extending between the stem fibers (2), and having a smaller diameter than that of the stem fibers (2). The plurality of stem fibers (2) include one stem fiber (2) and another stem fiber (2) branching from the one stem fiber and have a void between the stem fibers. The stem fibers (2) hold a plurality of inorganic particles (5). The fiber sheet preferably has a pore volume fraction of 50% or more and 98% or less. In the fiber sheet, the number of fibers having a diameter of 500 nm or less is preferably 50% or more of the total number of the constituent fibers. The inorganic particles preferably include zinc oxide. The fiber sheet is preferably produced by uniaxially drawing a resin sheet containing a thermoplastic resin and inorganic particles.

20 Claims, 7 Drawing Sheets

(56) References Cited

U.S. PATENT DOCUMENTS

2016/0376436 A1 12/2016 Li et al.
2018/0037704 A1  2/2018 Ishiguro et al.

FOREIGN PATENT DOCUMENTS

| JP | 2004-8873   | A |  1/2004 |
| JP | 2012-7156   | A |  1/2012 |
| JP | 2012-72380  | A |  4/2012 |
| JP | 2012-167181 | A |  9/2012 |
| JP | 2012-193224 | A | 10/2012 |
| JP | 2013-166804 | A |  8/2013 |
| JP | 2014-224240 | A | 12/2014 |
| JP | 2016-160267 | A |  9/2016 |
| JP | 2018-95874  | A |  6/2018 |

OTHER PUBLICATIONS

Extended European Search Report issued Aug. 11, 2022 in European Patent Application No. 19909452.5, 9 pages.

Fig. 2(a) Example 1
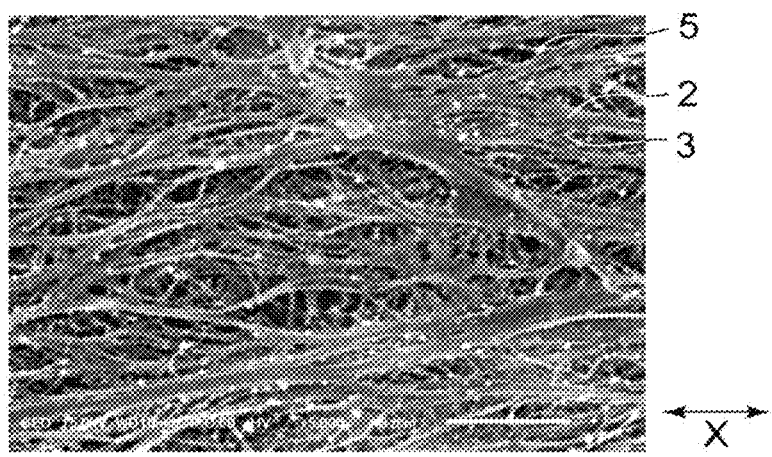
Fig. 2(b) Example 2
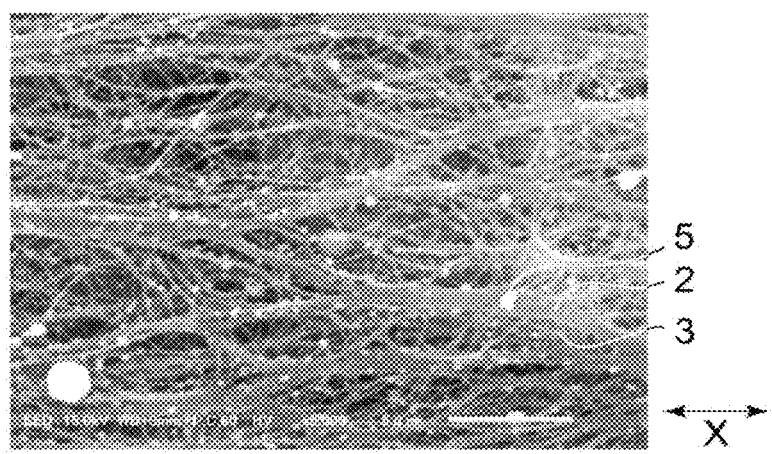
Fig. 2(c) Example 3
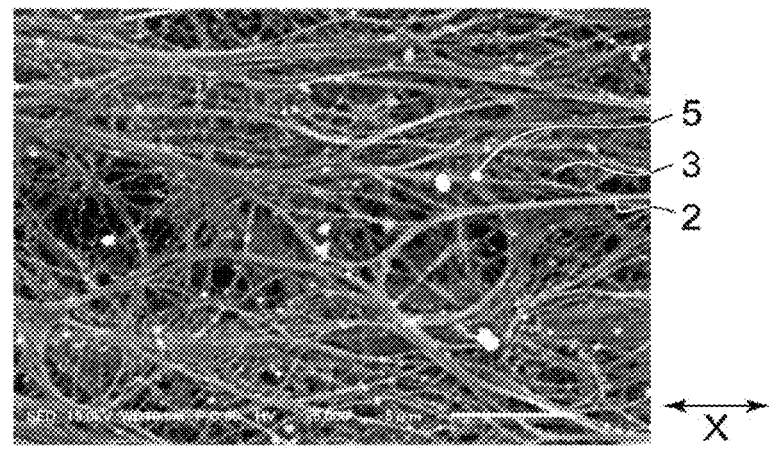

Example 4

Comparative
Example 2

Comparative Example 3

Comparative Example 4

Comparative Example 5

Fig. 6
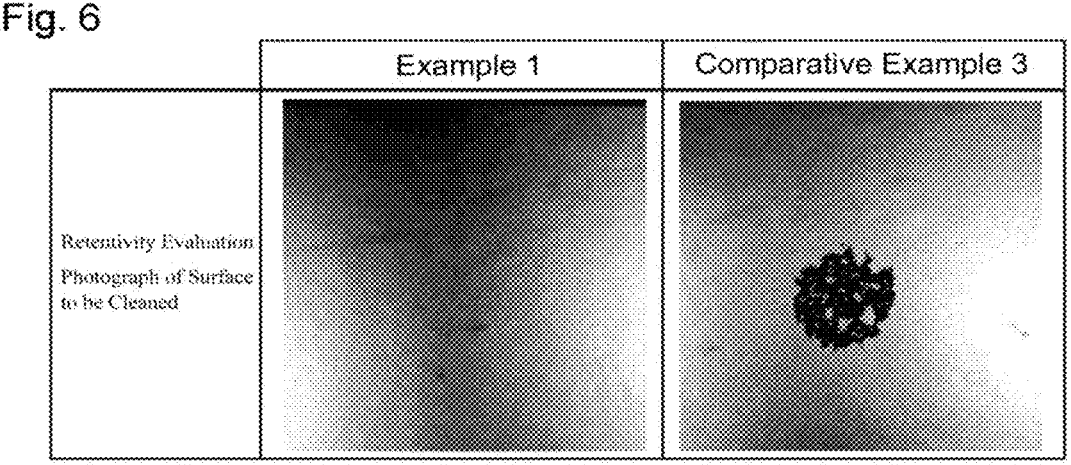
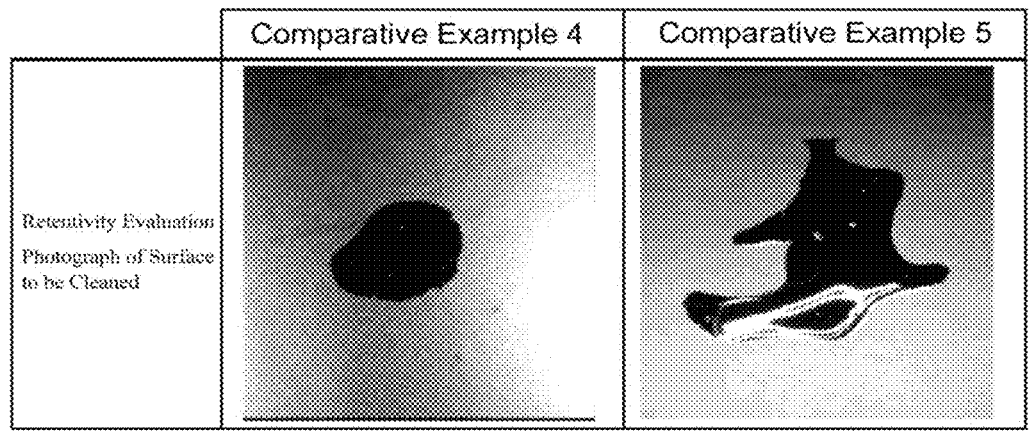

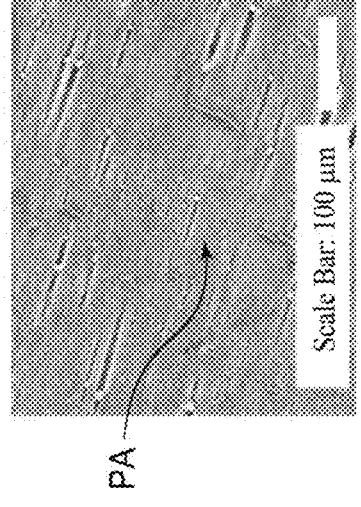
Fig. 7(a) Example 5
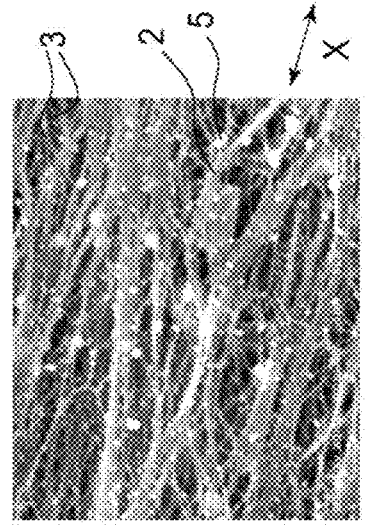
Fig. 7(b) Example 1
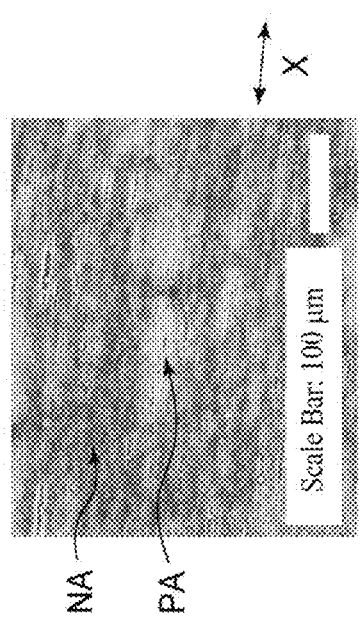
Fig. 7(c) Example 5 (Magnified)
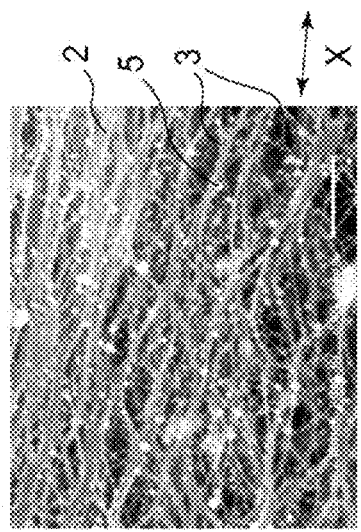
Fig. 7(d) Example 1 (Magnified)

FIBER SHEET AND METHOD FOR PRODUCING SAME

TECHNICAL FIELD

The present invention relates to a fiber sheet and a method for producing the fiber sheet.

BACKGROUND ART

Porous films containing inorganic particles have been used in various applications. For example, Patent Literature 1 discloses a porous resin film containing 30 to 80% by weight of a thermoplastic resin and 70 to 20% by weight of inorganic and/or organic fine powders having a surface treated with two surface treating agents. According to the literature, the film is usable for printing using aqueous inks and in an application using an aqueous system.

Patent Literature 2 discloses a porous film that includes a composition containing a polymer and inorganic particles and contains many micropores having an average pore size of 0.01 to 10 μm at a porosity of 30 to 85%. According to the literature, the porous film is usable, for example, for an electronic paper film, a photoelectrode, and an electromagnetic wave controller.

CITATION LIST

Patent Literatures

Patent Literature 1: JP 2001-181423 A
Patent Literature 2: JP 2012-167181 A

SUMMARY OF INVENTION

The present invention relates to a fiber sheet.

In an aspect, the fiber sheet includes: a plurality of stem fibers containing a thermoplastic resin and extending in one direction; and a fibril fiber containing substantially the same thermoplastic resin as the thermoplastic resin, extending between the stem fibers, and having a smaller diameter than that of the stem fibers.

In an aspect, the plurality of stem fibers include first stem fiber and second stem fiber branching from the first stem fiber and have a void between the stem fibers.

In an aspect, the stem fibers hold a plurality of inorganic particles.

The present invention also relates to a method for producing the fiber sheet.

In an aspect, the method includes a step of uniaxially drawing a resin sheet containing a thermoplastic resin and inorganic particles.

BRIEF DESCRIPTION OF DRAWINGS

FIGS. 2(a) to 2(c) are scanning electron micrographs of sheet surfaces of fiber sheets in examples.

FIG. 6 includes photographs of surfaces to be cleaned in evaluations of greasy dirt adsorptivity when fiber sheets in an example and comparative examples were used.

FIGS. 7(a) and 7(b) are scanning electron micrographs of sheet surfaces in examples, and FIGS. 7(c) and 7(d) are magnified scanning electron micrographs of formation portions of fibril fibers on the sheet surfaces in FIGS. 7(a) and 7(b).

DESCRIPTION OF EMBODIMENTS

As a fiber sheet for removing greasy dirt such as sebum, a sheet containing ultrafine fibers of a thermoplastic resin has been known. The sheet is typically produced by making ultrafine fibers that contain a thermoplastic resin and are prepared from split type conjugate fibers split and divided, into a sheet, but the production method includes complicated steps, and is not favorable from the viewpoint of cost efficiency. Each porous film according to Patent Literature 1 and Patent Literature 2 is produced by a relatively simple method, but the literatures do not describe cleaning application or adsorptive retention and removal performance of greasy dirt. Even if the porous films according to the literatures were used for removal of greasy dirt, the removal performance of greasy dirt would be insufficient.

The present invention relates to a fiber sheet capable of solving the above problems. The fiber sheet of the present invention will now be described on the basis of preferred embodiments. The fiber sheet of the present invention is a sheet to be used for cleaning, cleansing, filtration, adsorption, and other applications and is used, for example, for building cleaning such as floor, wall, ceiling, and pillar cleaning, cleaning of fittings and fixtures, wiping of articles, cleansing of human bodies such as the skin and the scalp, cleansing of instruments for human bodies and clothing, and purification by filtration and adsorption of greasy dirt dispersed in a liquid such as water or in a gas such as air.

Figure 1:
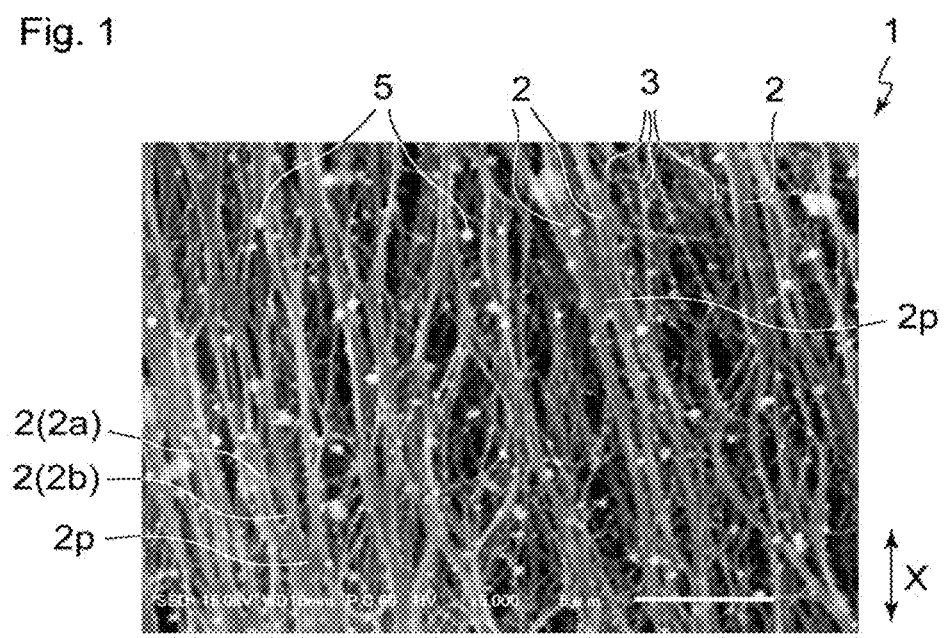
FIG. 1 is a scanning electron micrograph of a sheet surface of a fiber sheet in an embodiment of the present invention.

The fiber sheet of the present invention includes a plurality of stem fibers and fibril fibers having a smaller diameter than that of the stem fibers, and both the stem fibers and the fibril fibers contain a thermoplastic resin. The fibril fibers in the present description are fibers having a fiber diameter of 250 nm or less, and fibers having a fiber diameter of more than 250 nm are stem fibers. As shown in FIG. 1, a fiber sheet 1 includes a plurality of stem fibers 2 extending in one direction. When any stem fiber 2a of the plurality of stem fibers 2 is observed, the stem fiber 2a and another stem fiber 2b branching from the stem fiber 2a are included. The stem fiber 2a has a structure branching from another stem fiber and has a junction 2p at which stem fibers 2 are partially joined to each other. Each thickness of the stem fibers 2a, 2b is smaller than the thickness at a portion with the junction 2p. The thickness of a stem fiber 2 is the same as or different from that of another stem fiber 2. The cross-sectional shape of the stem fiber 2 can be a round shape such as a perfect circular shape and an elliptical shape, a polygonal shape such as a triangular shape, a quadrangular shape, and a pentagonal shape, a plate-like shape, or a combination thereof. Of the stem fibers 2, a single stem fiber 2 may have a combination of such shapes, or the respective stem fibers 2 may have any of the above shapes.

Between the stem fibers 2a, 2b, three-dimensional voids free from a thermoplastic resin are present while penetrating in the sheet plane direction and the thickness direction, and the voids communicate with each other to form fine pores in the fiber sheet 1. The pores are typically open pores.

The fiber sheet 1 includes a plurality of fibril fibers 3 having a smaller diameter than that of the stem fibers 2. The fibril fiber 3 extends between the stem fibers 2, 2 and is formed so as to branch from at least one stem fiber 2. The fibril fiber 3, for example, has the following form of structure: (i) a fibril fiber 3 branches from a stem fiber 2, first end of the fibril fiber is a fixed end bonded to the stem fiber 2, and second end of the fibril fiber 3 is a free end not bonded to any fiber; or (ii) a fibril fiber 3 branches from a stem fiber 2, first end of the fibril fiber is bonded to the stem fiber 2, and second end of the fibril fiber 3 is a fixed end that is bonded to the same stem fiber 2 or to another stem fiber 2 or is bonded to anther fibril fiber 3. Specifically, the fibril fibers 3 are preferably present in the form of structure (ii) from the viewpoint of improving adsorptive retention and removal performance of greasy dirt.

The fibril fiber 3 is formed so as to branch from the stem fiber 2. The fibril fiber 3 contains substantially the same thermoplastic resin as the stem fiber 2, and the stem fiber 2 and the fibril fiber 3 are preferably formed to contain the same thermoplastic resin. The thickness of a fibril fiber 3 is the same as or different from that of another fibril fiber 3. The cross-sectional shape of the fibril fiber 3 can be a round shape such as a perfect circular shape and an elliptical shape, a polygonal shape such as a triangular shape, a quadrangular shape, and a pentagonal shape, a plate-like shape, or a combination thereof. Of the fibril fibers 3, a single fibril fiber 3 may have a combination of such shapes, or the respective fibril fibers 3 may have any of the above shapes.

In addition to between the stem fibers 2, between the stem fiber 2 and the fibril fiber 3 and between the fibril fibers 3, three-dimensional voids free from a thermoplastic resin are present while penetrating in the sheet plane direction and the thickness direction. Accordingly, a three-dimensional matrix in which fibers are reticulated is formed, and the voids formed among fibers communicate with each other to form fine pores in the fiber sheet 1. The pores are typically open pores.

Examples of the thermoplastic resin included in the stem fibers 2 and the fibril fibers 3 include polyolefin resins such as polyethylene (PE), linear low-density polyethylene (LLDPE), branched low-density polyethylene (LDPE), high-density polyethylene (HDPE), polypropylene (PP), an ethylene-propylene copolymer, and polybutene; polyester resins such as polyethylene terephthalate (PET); polyamide resins; vinyl resins such as polyvinyl chloride and polystyrene; acrylic resins such as polyacrylic acid and polymethyl methacrylate; and fluorine resins such as polyperfluoroethylene. These resins may be used singly or in combination of two or more of them. Of them, a polyolefin resin is preferably contained, and polypropylene is more preferably contained, from the viewpoint of improving sheet moldability.

The fiber sheet includes, in addition to the stem fibers 2 and the fibril fibers 3, inorganic particles. As shown in FIG. 1, in the fiber sheet 1, the stem fibers 2 hold a plurality of inorganic particles 5. The inorganic particles 5 are dispersed and placed in the plane direction of the fiber sheet 1, and some or all of the inorganic particles 5 are placed so as to be exposed from the stem fibers 2. When some of the inorganic particles 5 are exposed, the remainder of the particles 5 are embedded in the fibers. The inorganic particles functions to make the sheet porous when the fiber sheet is produced, and is used for adsorptive retention of greasy dirt such as grease and sebum when the sheet is used.

Examples of the inorganic particles included in the fiber sheet include particles of a mineral such as gypsum, talc, clay, kaolin, silica, mica, zeolite, and diatomaceous earth; particles of a metal carbonate such as calcium carbonate, magnesium carbonate, and barium carbonate; particles of a metal oxide such as aluminum oxide (alumina), aluminum oxide, zinc oxide, and titanium oxide; particles of a metal sulfate such as sodium sulfate, calcium sulfate, magnesium sulfate, and barium sulfate; particles of a metal phosphate such as calcium phosphate; particles of a metal hydroxide such as aluminum hydroxide; carbon particles such as activated carbon and carbon black; and a metal powder such as aluminum powder, iron powder, and copper powder. These types of particles may be used singly or in combination of two or more of them. The shape of the inorganic particles can be a spherical shape, a massive shape, a fibrous shape, or an indefinite shape, for example.

Specifically, from the viewpoint of improving handleability, sheet moldability, and adsorptivity of greasy dirt, the inorganic particles are preferably particles of a substance reactive with an acid, more preferably particles of at least one of zinc oxide, calcium carbonate, and activated carbon, and even more preferably particles of zinc oxide. In particular, when zinc oxide is used as the inorganic particles, fatty acids contained in sebum as a form of greasy dirt can be chemically reacted with zinc oxide into metal salts of the fatty acids, and the metal salts can be effectively adsorbed and retained by the fiber sheet. As a result, the fiber sheet of the present invention has particularly excellent removal performance of sebum contaminations. In addition, even when a fiber sheet adsorbing greasy dirt such as sebum is used to continuously cleanse a surface to be cleansed such as the skin, the adsorbed sebum is advantageously unlikely to re-adhere onto the surface to be cleansed.

In the fiber sheet of the present invention having the above structure, stem fibers and fibril fibers having a smaller diameter than that of the stem fibers are included, and fine pores including voids are three-dimensionally formed among the fibers. Hence, the sheet has a higher capillary force, and the high capillary force enables the sheet to adsorb greasy dirt such as grease and sebum on a surface to be cleaned or in a fluid. In addition, the fiber sheet of the present invention contains a thermoplastic resin and inorganic particles and thus exerts stronger hydrophobic interaction between the thermoplastic resin and greasy dirt and between the inorganic particles and greasy dirt. As a result, the fiber sheet of the present invention can strongly adsorb and retain greasy dirt such as grease and sebum and achieve high greasy dirt removal performance.

Specifically, the capillary force is represented by Formula (A). In the fiber sheet of the present invention, many fine pores are formed among the stem fibers and the fibril fibers, and thus the capillary radius in Formula (A) is small. As a result, the sheet has a higher capillary force to exert excellent adsorptive retention performance of greasy dirt and to have high removal performance of greasy dirt from a surface to be cleaned or a fluid.

$$P = (2\gamma \times \cos\theta)/r \qquad (A)$$

(In the formula, P is the capillary force $[N/m^2]$ of a fiber aggregate; $\gamma$ is the surface tension $[N/m]$ of a liquid; $\theta$ is the contact angle [rad] between a fiber and a liquid; and r is a capillary radius (the radius of a pore) [m]).

In particular, when fibril fibers 3 are mainly present in the above preferred form of structure (ii) in which a fibril fiber 3 branches from a stem fiber 2, first end of the fibril fiber 3 is bonded to the stem fiber 2, and second end of the fibril fiber 3 is a fixed end that is bonded to the same stem fiber 2 or to another stem fiber 2 or is bonded to anther fibril fiber 3, fine pores are sufficiently formed among the stem fibers and the fibril fibers. Hence, as compared with the case in which fibril fibers 3 are mainly present in such a form (i) as described above in which a fibril fiber has a free end, a high capillary force is likely to be generated due to the formation of fine pores. As a result, the fiber sheet has excellent adsorptive retention performance of greasy dirt and high removal performance of greasy dirt from a surface to be cleaned or a fluid.

This point is advantageous when, for example, the fiber sheet is used as a sebum removal sheet because re-adhesion of the adsorbed sebum onto the skin is suppressed even when a surface to be cleansed such as the skin is continuously cleansed.

In the fiber sheet of the present invention, a three-dimensional matrix in which stem fibers and fibril fiber are reticulated is formed, and voids are formed among these fibers. The fiber sheet of the present invention preferably has a pore volume fraction of 50% or more and more preferably 60% or more and preferably 98% or less and more preferably 95% or less. When having such a structure, the sheet has much higher capillary force, thus can strongly adsorb and retain greasy dirt such as grease and sebum, and exerts much higher greasy dirt removal performance. The pore volume fraction of a fiber sheet can be determined, for example, by the method described later.

From a similar viewpoint, the pore size of the pores formed in the fiber sheet is preferably 10 nm or more and more preferably 50 nm or more and preferably 50 μm or less and more preferably 30 μm or less. The pore size of a fiber sheet can be determined, for example, by the method described later.

From a similar viewpoint, the cumulative pore volume of the pores formed in the fiber sheet is preferably 0.8 mL/g or more and more preferably 1.0 mL/g or more and preferably 20 mL/g or less and more preferably 10 mL/g or less. The cumulative pore volume of a fiber sheet can be determined, for example, by the method described below.

The pore volume fraction, the pore size, and the cumulative pore volume of a fiber sheet can be determined in accordance with the mercury porosimetry defined by JIS R 1655 by the following method. In particular, 2 to 3 g of a measurement sample is cut out from a sheet to be measured, a measurement cell containing the measurement sample is set to a mercury porosimeter (AutoPore 1V9520, manufactured by Micromeritics), and the pore volume of the measurement sample is determined. Next, the relation between converted pore size $D_0$ converted in accordance with Formula (1) and pore volume is plotted.

$$D_0 = -4\gamma \cos \theta / P \quad (1)$$

(γ: surface tension of mercury, θ: contact angle, P: pressure)

The measurement is performed in an environment of 22° C. and 65% RH. The surface tension γ of mercury is 480 dyn/cm, the contact angle θ is 140°, and the mercury injection pressure P is 0 psia or more and 60,000 psia or less. Based on the distribution curve of converted pore size $D_0$ obtained in the measurement condition, a cumulative sum of converted pore sizes of 0.0018 μm or more and 100 μm or less is regarded as the cumulative pore volume (mL/g), and a median value of pore size on the distribution curve is regarded as the pore size (μm) in the present invention. The pore volume fraction (%) is a value calculated in accordance with Formula (2).

Pore volume fraction (%)=100×((density of inorganic particle-containing thermoplastic resin [g/cm³])−(density of fiber sheet [g/cm³]))/(density of inorganic particle-containing thermoplastic resin [g/cm³])  (2)

In particular, from the viewpoint of facilitating the formation of pores in the above preferred range and of improving the production efficiency of a fiber sheet including stem fibers and fibril fibers, the fiber sheet of the present invention is preferably produced by uniaxially drawing a resin sheet containing a thermoplastic resin and inorganic particles. In FIG. 1, the direction indicated by sign X is the drawing direction of the resin sheet.

From a similar viewpoint, the thermoplastic resin contained in the fiber sheet preferably has a melt flow rate of 2 g/10 min or more, more preferably 5 g/10 min or more, and even more preferably 8 g/10 min or more and preferably 100 g/10 min or less and more preferably 80 g/10 min or less, as determined in accordance with JIS K 7210. The melt flow rate can be determined in accordance with JIS K 7210 by applying heat and load depending on the type of a polyolefin resin. For example, when polypropylene as a polyolefin resin is used as the thermoplastic resin, the measurement is performed in a condition of a temperature of 190° C. and a load of 21.18 N.

From the viewpoint of increasing the capillary force of the sheet and of further improving the removal efficiency of greasy dirt, in the fiber sheet of the present invention, of all the fibers included in the fiber sheet, the number of fibers having a diameter of 500 nm or less is preferably 50% or more of the total number of the constituent fibers and more preferably 60% or more and preferably 95% or less and more preferably 90% or less. The diameter and the number of fibers are determined as follows: a sheet to be measured is observed under a scanning electron microscope; each maximum length of 100 or more observed fibers in a direction orthogonal to the corresponding fiber extending direction is defined as the diameter; and the number of fibers having a diameter of 500 nm or less is counted. Next, based on the total number of observed fibers, the proportion of the number of fibers having a diameter of 500 nm or less is calculated.

From the viewpoint of satisfying both the improvement in sheet strength and the improvement in removal efficiency of greasy dirt, the stem fiber 2 preferably has a fiber diameter W1 of 300 nm or more and more preferably 400 nm or more and preferably 5 μm or less and more preferably 1 μm or less. The fibril fiber 3 preferably has a fiber diameter W2 of 10 nm or more and more preferably 50 nm or more and preferably 250 nm or less and more preferably 200 nm or less, provided that the fiber diameter W2 is smaller than the fiber diameter W1 of the stem fiber. Each fiber diameter is the same as the diameter of a fiber described above and can be determined in a similar manner to the above method.

From the viewpoint of achieving the strength of the obtained sheet and improving moldability, the inorganic particles preferably have an average particle diameter W3 of 50 nm or more and more preferably 100 nm or more and preferably 8 μm or less and more preferably 5 μm or less. The inorganic particles preferably have a maximum particle diameter of 20 μm or less and more preferably 15 μm or less. The particle diameter of inorganic particles is determined as follows: for example, 50 inorganic particles on a sheet surface are observed under a scanning electron microscope; the maximum diameter (Feret's diameter) of each inorganic particle is determined; and the average is calculated as the average particle diameter. The maximum particle diameter of inorganic particles is the maximum diameter (Feret's diameter) of the inorganic particles measured for calculation of the average particle diameter.

The ratio (W3/W1) of the average particle diameter W3 (μm) of the inorganic particles to the fiber diameter W1 (μm) of the stem fiber 2 is preferably 0.1 or more and more preferably 0.3 or more and preferably 10 or less and more preferably 5 or less. The ratio (W3/W2) of the average particle diameter W3 (μm) of the inorganic particles to the fiber diameter W2 (μm) of the fibril fiber 3 is preferably 0.1 or more and more preferably 0.3 or more and preferably 10 or less and more preferably 5 or less. When the fiber diameter of each fiber and the average particle diameter of the inorganic particles satisfy the above relations, greasy dirt can be more effectively removed.

From the viewpoint of improving removal efficiency of greasy dirt, the inorganic particles preferably have a Blaine specific surface area of 20,000 $cm^2/g$ or more and more preferably 20,500 $cm^2/g$ or more and preferably 22,000 $cm^2/g$ or less. The Blaine specific surface area of inorganic particles can be determined, for example, by using a Blaine air-permeability apparatus in accordance with JIS R 5201.

From the viewpoint of achieving both sheet strength and greasy dirt removal performance at high levels, the content of the thermoplastic resin in the fiber sheet is preferably 30% by mass or more and more preferably 40% by mass or more and preferably 95% by mass or less and more preferably 90% by mass or less.

From a similar viewpoint, the content of the inorganic particles in the fiber sheet is preferably 5% by mass or more and more preferably 10% by mass or more and preferably 70% by mass or less and more preferably 60% by mass or less.

From the viewpoint of improving the dispersibility of inorganic particles, forming many fine pores in the whole sheet, and further improving greasy dirt removal performance, the fiber sheet of the present invention preferably contains a dispersant for inorganic particles. Examples of the dispersant for inorganic particles include a silicone oil, a fatty acid, a maleic acid-modified polypropylene, and a maleic acid-modified polyethylene. These dispersants may be used singly or in combination of two or more of them. Of them, from the viewpoint of achieving excellent dispersibility of inorganic particles, a silicone oil is preferably contained as the dispersant for inorganic particles. The dispersant for inorganic particles is contained in the stem fibers 2 and the fibril fibers 3. In particular, by using zinc oxide particles as the inorganic particles and using a silicone oil as the dispersant, many fine pores can be uniformly formed in the whole sheet, and the adsorptive retention performance and removal performance of greasy dirt can be further improved. Such a condition is thus advantageous.

When a silicone oil is used as the dispersant, examples of the silicone oil include dimethylpolysiloxane, dimethylcyclopolysiloxane, methylphenylpolysiloxane, methylhydrogenpolysiloxane, and a higher alcohol-modified organopolysiloxane. These silicone oils may be used singly or in combination of two or more of them. Of them, from the viewpoint of improving the compatibility with the thermoplastic resin as a material of the fiber sheet and of further improving the dispersibility of the inorganic particles, at least methylhydrogenpolysiloxane is more preferably used.

When the fiber sheet contains a dispersant for inorganic particles, the content of the dispersant for inorganic particles in the fiber sheet is preferably 0.1% by mass or more, more preferably 0.5% by mass or more, even more preferably 2% by mass or more, and further preferably 4% by mass or more and preferably 30% by mass or less, more preferably 20% by mass or less, and even more preferably 17% by mass or less. When the content of the dispersant is within the above range, the fiber sheet can be made uniformly porous when the fiber sheet is produced, and can evenly adsorb and retain greasy dirt when the sheet is used.

When the fiber sheet contains a dispersant for inorganic particles, inorganic particles previously surface-treated with the dispersant may be used. When the surface of inorganic particles is treated with a dispersant, a dispersant to hydrophobize the surface is preferably used. As the hydrophobizing dispersant, the dispersants described above can be appropriately used, for example.

The fiber sheet of the present invention can contain an additive depending on applications thereof. Examples of the additive include a resin plasticizer, a resin crystal nucleating agent, a crosslinking agent, an antistatic agent, a pigment, and an antioxidant. The content of the additive in the fiber sheet can be 0.001% by mass or more and 10% by mass or less.

When polypropylene is used as the thermoplastic resin contained in the fiber sheet of the present invention, a resin crystal nucleating agent is preferably contained, and a β-crystal nucleating agent for polypropylene used for helping a polypropylene resin to have a β-crystal structure is more preferably contained, from the viewpoint of uniformly forming many fine pores in the whole sheet and of further improving adsorptive retention performance and removal performance of greasy dirt. When a resin crystal nucleating agent such as a β-crystal nucleating agent is contained, physical properties of a thermoplastic resin such as polypropylene are modified, thus the formation efficiency of fibril fibers 3 is improved when the fiber sheet is produced, and the fiber sheet can be made uniformly porous when the fiber sheet is produced. Accordingly, fine pores can be efficiently formed among the stem fibers 2 and the fibril fibers 3 in the whole sheet. As a result, the produced fiber sheet has much higher adsorptive retention performance and removal performance of greasy dirt. When a resin crystal nucleating agent is used to produce a fiber sheet, the resin crystal nucleating agent is contained in the stem fibers 2 and the fibril fibers 3.

When polypropylene is used as the thermoplastic resin, examples of the β-crystal nucleating agent suitably used in the present invention include 2-N,6-N-dicyclohexylnaphthalene-2,6-dicarboxamide, quinacridone, N,N'-diphenylhexanediamide, 1-N,4-N-dicyclohexylbenzene-1,4-dicarboxamide, N-[4-(cyclohexanecarbonylamino)phenyl]cyclohexanecarboxamide, N-(4-benzamidocyclohexyl)benzamide, N-(5-benzamidonaphthalen-1-yl)benzamide, N-[4-(cyclohexanecarbonylamino)cyclohexyl]cyclohexanecarboxamide, 4-(cyclohexanecarbonylamino)-N-cyclohexylbenzamide, and N-(5-anilinopentyl)benzamide. These agents may be used singly or in combination of two or more of them.

The content of the resin crystal nucleating agent in the fiber sheet can be preferably 0.001% by mass or more, more preferably 0.005% by mass or more, and even more preferably 0.01% by mass or more and preferably 10% by mass or less, more preferably 5% by mass or less, and even more preferably 1% by mass or less, relative to the thermoplastic resin used. When a β-crystal nucleating agent is used as the resin crystal nucleating agent, the content of the β-crystal nucleating agent can also be within the above range.

Although the fiber sheet of the present invention has been described above, a preferred method for producing the fiber sheet of the present invention will next be described. The method for producing the fiber sheet includes a step of uniaxially drawing a resin sheet containing a thermoplastic resin and inorganic particles.

First, a resin composition containing a thermoplastic resin and inorganic particles is molded into a resin sheet. The resin composition can be prepared, for example, by heating and kneading a thermoplastic resin and inorganic particles with a single- or twin-screw extruder into a molten mixture. The heating temperature during the heating and kneading can be set depending on the type of a thermoplastic resin, and can be 120° C. or more and 210° C. or less for a polyolefin resin, for example. Each content of the thermoplastic resin and the inorganic particles in the resin composition can be appropriately set so as to give the above content ranges.

From the viewpoint of improving the dispersibility of inorganic particles in the resin composition and of forming fibril fibers having a smaller diameter, a resin composition containing a dispersant for inorganic particles is preferably used, and more preferably, a silicone oil is used as the dispersant. As needed, for example, in order to form fibril fibers in the whole sheet and to make the resulting fiber sheet uniformly porous, an additive such as a resin crystal nucleating agent including the above-described β-crystal nucleating agent may be added to the resin composition. The content of the dispersant for inorganic particles and the content of an additive such as a resin crystal nucleating agent in the resin composition can be appropriately set so as to give the above content ranges.

Next, the molten resin composition containing the above components is molded into a resin sheet including the resin composition. The resin sheet is formed from the resin composition containing a thermoplastic resin and inorganic particles, and thus the resin composition and the resin sheet have substantially the same formulation. The resin sheet therefore contains a thermoplastic resin and inorganic particles.

The resin composition preferably has a melt flow rate of 2 g/10 min or more and more preferably 5 g/10 min or more from the viewpoint of improving production efficiency of the sheet. The upper limit thereof is preferably 500 g/10 min or less and more preferably 100 g/10 min or less.

The molding machine used for molding a molten resin composition into a sheet shape can be a known molding machine such as a T-die molding machine and an inflation molding machine. The heating temperature during the molding may be any temperature at which at least the resin composition can be molten, and from the viewpoint of simple molding and of prevention of thermal decomposition of components in the resin composition, the heating temperature is preferably (M+20°) C. or more and (M+60°) C. or less where M is the melting point (° C.) of a thermoplastic resin as the material. For a resin composition including a plurality of resins, the highest melting point of the constituent resins is regarded as the melting point M of the resin composition. When the molten resin composition is molded into a sheet shape, the molded article may be naturally cooled or may be quenched by using a cooling means as needed.

Next, the resin sheet obtained through the above procedure is uniaxially drawn. The uniaxial drawing leads to interfacial debonding between the thermoplastic resin and the inorganic particles contained in the resin composition, and the sheet can be made porous. As a result, the fibers containing the thermoplastic resin form a three-dimensional matrix, and a reticulated fiber sheet having fine pores in the sheet can be produced. The fiber sheet produced as above is prepared by drawing a resin sheet that contains a thermoplastic resin and inorganic particles and preferably further contains at least one of a dispersant for inorganic particles and an additive such as a resin crystal nucleating agent, and thus the fiber sheet and the resin sheet have substantially the same formulation.

Examples of the method for uniaxially drawing a resin sheet include a roll method and a tenter method. The uniaxial drawing is preferably performed while a resin sheet is heated. When heat treatment is performed, the resin sheet is preferably heated at (M−40°) C. or more and more preferably (M−35°) C. or more and preferably (M−15°) C. or less and more preferably (M−20°) C. or less where M is the melting point (° C.) of a thermoplastic resin as the material. For a resin sheet containing a plurality of thermoplastic resins, the melting point of a thermoplastic resin having the highest melting point of the resins is regarded as the melting point M.

Specifically, when polypropylene (melting point M: 165° C.) is used as the thermoplastic resin, the resin sheet is preferably heated at 125° C. or more and more preferably 130° C. or more and preferably 150° C. or less and more preferably 145° C. or less. When polyethylene (melting point M: 122° C.) is used as the thermoplastic resin, the resin sheet is preferably heated at 82° C. or more and more preferably 87° C. or more and preferably 107° C. or less and more preferably 102° C. or less. By performing the uniaxial drawing at such a heating temperature, interfacial debonding of the resin sheet is caused while the resin sheet is uniformly drawn, and a fiber sheet containing stem fibers, fibril fibers, and voids can be successfully formed. The heating method of a resin sheet is not specifically limited, and examples include a method of bringing a resin sheet into contact with a heated roller and a method of heating a resin sheet by hot wind or a heater.

In a resin sheet including polypropylene as the thermoplastic resin and containing a resin crystal nucleating agent, preferably a β-crystal nucleating agent for polypropylene, the polypropylene is likely to have a β-crystal structure. The β-crystal structure has a lower melting point and softer physical properties than those of an α-crystal structure, which is the stable structure of polypropylene. When such a resin sheet is uniaxially drawn, the resin sheet is likely to be evenly, uniformly drawn, thus a three-dimensional matrix including stem fibers and fibril fibers is uniformly formed in the whole sheet, and a reticulated fiber sheet having fine pores in the sheet can be easily produced. In addition, the obtained fiber sheet has much higher adsorptive retention performance and removal performance of greasy dirt.

From the viewpoint of successfully forming a fiber sheet including stem fibers, fibril fibers, and voids while preventing the sheet from breaking during uniaxial drawing, the drawing speed of the resin sheet during the uniaxial drawing is preferably 3 mm/sec or more and more preferably 5 mm/sec or more and preferably 1,000 mm/sec or less and more preferably 500 mm/sec or less.

A resin sheet to be drawn by uniaxial drawing is preferably drawn so that the drawing factor becomes high. Specifically, as the drawing factor in uniaxial drawing, the drawing treatment is preferably performed such that the resin sheet area becomes 2.5 times or more, the drawing treatment is more preferably performed such that the resin sheet area becomes 3 times or more, and the drawing treatment is even more preferably performed such that the resin sheet area becomes 3.5 times or more. As for the upper limit, the drawing treatment is preferably performed such that the resin sheet area becomes 10 times or less, the drawing treatment is more preferably performed such that the resin sheet area becomes 8 times or less, and the drawing treatment is even more preferably performed such that the resin sheet area becomes 7 times or less. By performing drawing treatment at such a drawing factor, preferably at a higher drawing factor, interfacial debonding is caused in a resin sheet, and a fiber sheet including fibril fibers having a small diameter and voids among fibers can be successfully produced. The drawing factor of a resin sheet can be achieved by appropriately setting the above heating temperature and the drawing speed.

In the drawing treatment of the resin sheet, from the viewpoint of satisfying both the strength of the resulting fiber sheet and high removal performance of greasy dirt, the uniaxial drawing is preferably performed such that the fiber sheet has a basis weight of 5 g/m² or more, and the uniaxial drawing is more preferably performed so as to give a basis weight of 10 g/m² or more. In addition, the uniaxial drawing is preferably performed so as to give a basis weight of 1,000 g/m² or less, and the uniaxial drawing is more preferably performed so as to give a basis weight of 800 g/m² or less. The basis weight of a fiber sheet can be achieved by setting the drawing factor of a sheet to be uniaxially drawn within the above range.

The fiber sheet produced through the above procedure contains a thermoplastic resin and inorganic particles, preferably contains a dispersant, and preferably contains a resin crystal nucleating agent such as a β-crystal nucleating agent, and a plurality of fine pores are formed in the fiber sheet. The fiber sheet may be used without treatment in a dry form or may be used in a wet form into which a cleaning liquid or the like is infiltrated as needed. In each case, in the fiber sheet of the present invention, stem fibers and fibril fibers as the constituent fibers form a three-dimensional matrix, and thus the fiber sheet has a high capillary force and achieves excellent adsorptive retention performance and removal performance of greasy dirt such as grease and sebum. In particular, the fiber sheet is suitably used for cleaning of articles with greasy dirt, cleansing of the skin of the face, scalp, arms, legs, joints, armpits, and the like, and purification of a fluid such as a liquid and a gas in which grease is dispersed, and is suitable as a sebum adsorption sheet.

When the fiber sheet is used in a wet form in which a cleaning liquid is infiltrated into the fiber sheet, the cleaning liquid infiltrated may be, for example, water alone or an aqueous solution mainly containing water and, as needed, containing a component such as a surfactant, an alcohol, a salt, a vitamin, a pH adjuster, a moisturizer, an antiseptic agent, a wetting agent, a viscosity modifier, and a flavoring agent. From the viewpoint of improving adsorptive retention performance and removal performance of greasy dirt, an aqueous solution containing a surfactant is preferably used.

The surfactant used in the cleaning liquid may be any of a nonionic surfactant, an amphoteric surfactant, a cationic surfactant, and an anionic surfactant, and from the viewpoint of satisfying both an improvement in adsorptive retention performance and removal performance of greasy dirt and suppression of skin irritation, for example, a nonionic surfactant such as a polyethylene glycol fatty acid ester is preferably used.

In particular, when a wet sheet in which an aqueous solution containing a surfactant is infiltrated into a fiber sheet containing zinc oxide particles as the inorganic particles is used, greasy dirt such as sebum can be emulsified by the surfactant and be removed from a surface to be cleaned, and the emulsified greasy dirt can be reacted with the inorganic particles and be adsorbed and retained. Hence, the adsorptive retention performance and removal performance of greasy dirt can be further improved. When the sheet is used as a sebum adsorption sheet, fatty acids contained in sebum can be efficiently removed from the skin, and thus skin troubles arising from fatty acids can be advantageously suppressed.

The content of the surfactant in the cleaning liquid is preferably 0.01% by mass or more and more preferably 0.05% by mass or more and preferably 5% by mass or less and more preferably 3% by mass or less from the viewpoint of satisfying both an improvement in adsorptive retention performance and removal performance of greasy dirt and suppression of skin irritation.

The present invention has been described on the basis of embodiments thereof, but the present invention is not limited to the above embodiments. For example, in the above embodiment, uniaxial drawing of a resin sheet is exemplified as a preferred method for producing the fiber sheet of the present invention, but the method for producing the fiber sheet is not limited thereto.

In the above embodiment, use of the fiber sheet of the present invention alone has been mainly described, but as long as advantageous effects of the invention are not impaired, the fiber sheet may be used in combination with another sheet or cleaning utensils such as a wiper.

In consideration of the above-described embodiments of the present invention, the following fiber sheets and the methods for producing the fiber sheet will be further disclosed.

<1>

1. A fiber sheet comprising:
   a plurality of stem fibers containing a thermoplastic resin and extending in one direction; and
   a fibril fiber containing substantially an identical thermoplastic resin with the thermoplastic resin, extending between the stem fibers, and having a smaller diameter than that of the stem fibers, wherein
   the plurality of stem fibers include first stem fiber and second stem fiber branching from the first stem fiber, and have a void between the stem fibers, and
   the stem fibers hold a plurality of inorganic particles.

<2>

The fiber sheet as set forth in clause <1>, in which the fibril fiber has a fiber diameter of 250 nm or less, and the stem fibers have a fiber diameter of more than 250 nm.

<3>

The fiber sheet as set forth in clause <1> or <2>, in which the stem fibers preferably have a fiber diameter of 300 nm or more and more preferably 400 nm or more and preferably 5 μm or less and more preferably 1 μm or less.

<4>

The fiber sheet as set forth in any one of clauses <1> to <3>, in which the fibril fiber preferably has a fiber diameter of 10 nm or more and more preferably 50 nm or more and preferably 250 nm or less and more preferably 200 nm or less.

<5>

The fiber sheet as set forth in any one of clauses <1> to <4>, in which the void is three-dimensionally present while penetrating in the sheet plane direction and the thickness direction.

<6>

The fiber sheet as set forth in any one of clauses <1> to <5>, having a pore volume fraction of 50% or more and 98% or less.

<7>

The fiber sheet as set forth in any one of clauses <1> to <6>, in which the fibril fiber is formed to branch from at least one of the stem fibers.

<8>

The fiber sheet as set forth in clause <7>, in which the fibril fiber branches from one of the stem fibers, first end of the fibril fiber is a fixed end bonded to the one stem fiber, and second end of the fibril fiber is a free end not bonded to any fiber.

<9>

The fiber sheet as set forth in clause <7>, in which the fibril fiber branches from one of the stem fibers, first end of the fibril fiber is bonded to the one stem fiber, and second end of the fibril fiber is a fixed end bonded to the one stem fiber or to another stem fiber.

<10>

The fiber sheet as set forth in clause <7>, in which the fibril fiber branches from one of the stem fibers, first end of the fibril fiber is bonded to the one stem fiber, and second end of the fibril fiber is a fixed end bonded to another fibril fiber.

<11>

The fiber sheet as set forth in any one of clauses <1> to <10>, in which the number of fibers having a diameter of 500 nm or less is 50% or more of the total number of the constituent fibers.

<12>

The fiber sheet as set forth in any one of clauses <1> to <11>, in which the inorganic particles include at least one of zinc oxide, calcium carbonate, and activated carbon.

<13>

The fiber sheet as set forth in any one of clauses <1> to <12>, in which the inorganic particles include zinc oxide.

<14>

The fiber sheet as set forth in any one of clauses <1> to <13>, produced by uniaxially drawing a resin sheet containing a thermoplastic resin and inorganic particles.

<15>

The fiber sheet as set forth in any one of clauses <1> to <14>, in which the inorganic particles are dispersed and placed in the plane direction of the sheet.

<16>

The fiber sheet as set forth in any one of clauses <1> to <15>, in which some or all of the inorganic particles are placed to be exposed from the stem fibers.

<17>

The fiber sheet as set forth in any one of clauses <1> to <16>, in which the inorganic particles are preferably contained at a content of 5% by mass or more and more preferably 10% by mass or more and preferably 70% by mass or less and more preferably 60% by mass or less.

<18>

The fiber sheet as set forth in any one of clauses <1> to <17>, further including a dispersant for the inorganic particles.

<19>

The fiber sheet as set forth in any one of clauses <1> to <18>, in which the thermoplastic resin is polypropylene and contains a β-crystal nucleating agent for the polypropylene.

<20>

The fiber sheet as set forth in clause <19>, in which the β-crystal nucleating agent is at least one of 2-N,6-N-dicyclohexylnaphthalene-2,6-dicarboxamide, quinacridone, N,N'-diphenylhexanediamide, 1-N,4-N-dicyclohexylbenzene-1,4-dicarboxamide, N-[4-(cyclohexanecarbonylamino)phenyl]cyclohexanecarboxamide, N-(4-benzamidocyclohexyl)benzamide, N-(5-benzamidonaphthalen-1-yl)benzamide, N-[4-(cyclohexanecarbonylamino)cyclohexyl]cyclohexanecarboxamide, 4-(cyclohexanecarbonylamino)-N-cyclohexylbenzamide, and N-(5-aninopentyl)benzamide.

<21>

The fiber sheet as set forth in clause <19> or <20>, in which the β-crystal nucleating agent is preferably contained at a content of 0.001% by mass or more, more preferably 0.005% by mass or more, and even more preferably 0.01% by mass or more and preferably 10% by mass or less, more preferably 5% by mass or less, and even more preferably 1% by mass or less.

<22>

A method for producing the fiber sheet as set forth in any one of clauses <1> to <21>, the method including uniaxially drawing a resin sheet containing a thermoplastic resin and inorganic particles at a temperature of (M−40°) C. or more and (M−15°) C. or less where M is the melting point (° C.) of the thermoplastic resin such that the area of the sheet becomes 2.5 times or more and 10 times or less.

<23>

The method for producing the fiber sheet as set forth in clause <22>, in which the resin sheet further containing a dispersant for the inorganic particles is uniaxially drawn.

<24>

The method for producing the fiber sheet as set forth in clause <23>, in which at least one selected from a silicone oil, a fatty acid, a maleic acid-modified polypropylene, and a maleic acid-modified polyethylene is used as the dispersant.

<25>

The method for producing the fiber sheet as set forth in clause <23> or <24>, in which a silicone oil is used as the dispersant.

<26>

The method for producing the fiber sheet as set forth in any one of clauses <22> to <25>, in which the thermoplastic resin preferably having a melt flow rate of 2 g/10 min or more as determined in accordance with JIS K 7210 is used.

<27>

The method for producing the fiber sheet as set forth in any one of clauses <22> to <26>, in which the resin sheet is preferably uniaxially drawn at a drawing speed of 3 mm/sec or more and more preferably 5 mm/sec or more and preferably 1,000 mm/sec or less and more preferably 500 mm/sec or less.

<28>

The method for producing the fiber sheet as set forth in any one of clauses <22> to <27>, in which polypropylene is used as the thermoplastic resin, and the resin sheet containing a β-crystal nucleating agent for the polypropylene is uniaxially drawn.

<29>

The method for producing the fiber sheet as set forth in clause <28>, in which at least one of 2-N,6-N-dicyclohexylnaphthalene-2,6-dicarboxamide, quinacridone, N,N'-diphenylhexanediamide, 1-N,4-N-dicyclohexylbenzene-1,4-dicarboxamide, N-[4-(cyclohexanecarbonylamino)phenyl]cyclohexanecarboxamide, N-(4-benzamidocyclohexyl)benzamide, N-(5-benzamidonaphthalen-1-yl)benzamide, N-[4-(cyclohexanecarbonylamino)cyclohexyl]cyclohexanecarboxamide, 4-(cyclohexanecarbonylamino)-N-cyclohexylbenzamide, and N-(5-anilinopentyl)benzamide is used as the β-crystal nucleating agent.

<30>

The method for producing the fiber sheet as set forth in clause <28> or <29>, in which the resin sheet preferably containing the β-crystal nucleating agent at a content of 0.001% by mass or more, more preferably 0.005% by mass or more, and even more preferably 0.01% by mass or more and preferably 10% by mass or less, more preferably 5% by mass or less, and even more preferably 1% by mass or less is used.

EXAMPLES

The present invention will next be described in further detail with reference to examples. However, the scope of the invention is not intended to be limited to the examples. In FIG. 2 to FIG. 4, sign X is the uniaxial drawing direction of a resin sheet.

Example 1

Polypropylene (melting point: 165° C., melt flow rate: 60 g/10 min) was used as a thermoplastic resin, spherical zinc oxide having an average particle diameter of 1 μm was used as inorganic particles, a silicone oil (methylhydrogenpolysiloxane) was used as a dispersant for inorganic particles, and these materials were heated and kneaded with a twin-screw extruder to give a resin composition. The resin composition in the example contained, as a resin crystal nucleating agent, a β-crystal nucleating agent (2-N,6-N-dicyclohexylnaphthalene-2,6-dicarboxamide, manufactured by New Japan Chemical Co., Ltd., NJSTAR NU-100).

The resulting resin composition was molded with a T-die extrusion molding machine to give a resin sheet. The resin sheet contained 49.98% by mass of the thermoplastic resin, 36.98% by mass of the inorganic particles, and 12.99% by mass of the dispersant and further contained 0.05% by mass of the β-crystal nucleating agent.

Next, the resulting resin sheet was uniaxially drawn at a drawing factor of 3 times in terms of the resin sheet area to give a fiber sheet having a basis weight of 200 g/m². The uniaxial drawing conditions were a heating temperature of 130° C. and a drawing speed of 5 mm/sec.

In the resulting fiber sheet, the pore volume fraction was 66%, the proportion of the number of fibers having a diameter of 500 nm or less was 95%, the pore size was 1.6 μm, and the cumulative pore volume was 1.86 mL/g. A scanning electron micrograph (a magnified image by a factor of 5,000) of the sheet surface in the example is shown in FIG. 2(a).

Example 2

The same procedure as in Example 1 was performed except that the heating temperature in the uniaxial drawing treatment was 140° C., giving a fiber sheet. The resulting fiber sheet had a basis weight of 200 g/m², the pore volume fraction was 71%, the proportion of the number of fibers having a diameter of 500 nm or less was 90%, the pore size was 1.5 μm, and the cumulative pore volume was 1.99 mL/g. A scanning electron micrograph (a magnified image by a factor of 5,000) of the sheet surface in the example is shown in FIG. 2(b).

Example 3

The same procedure as in Example 1 was performed except that in the uniaxial drawing treatment, uniaxial drawing was performed at a drawing factor of 7 times in terms of resin sheet area, giving a fiber sheet. The resulting fiber sheet had a basis weight of 85 g/m², the pore volume fraction was 82%, the proportion of the number of fibers having a diameter of 500 nm or less was 95%, the pore size was 1.5 μm, and the cumulative pore volume was 1.99 mL/g. A scanning electron micrograph (a magnified image by a factor of 5,000) of the sheet surface in the example is shown in FIG. 2(c).

Example 4

Figure 3A:
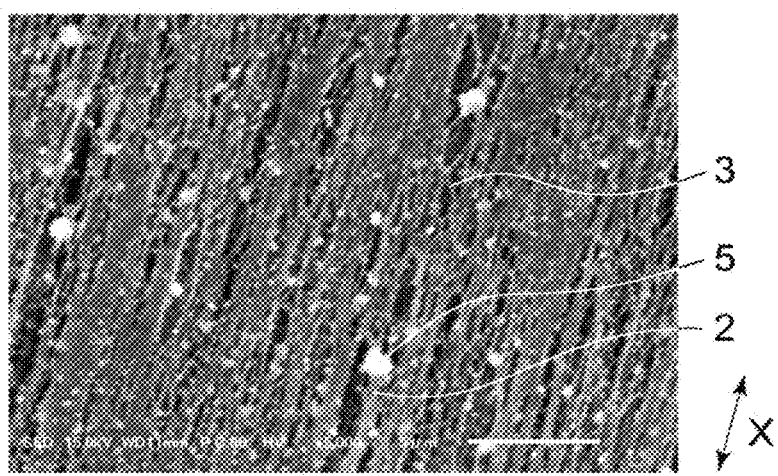
FIGS. 3(a) and 3(b) are scanning electron micrographs of sheet surfaces of fiber sheets in an example and a comparative example.

The same procedure as in Example 1 was performed except that polyethylene (melting point: 122° C., melt flow rate: 2.4 g/10 min) was used as the thermoplastic resin, and the heating temperature in the uniaxial drawing treatment was 90° C., giving a fiber sheet. The resulting fiber sheet had a basis weight of 90 g/m², the pore volume fraction was 65%, the proportion of the number of fibers having a diameter of 500 nm or less was 70%, the pore size was 1.7 μm, and the cumulative pore volume was 1.65 mL/g. A scanning electron micrograph (a magnified image by a factor of 5,000) of the sheet surface in the example is shown in FIG. 3(a). In the example, no resin crystal nucleating agent was used.

Comparative Example 1

The same procedure as in Example 1 was performed except that the heating temperature in the uniaxial drawing treatment was 120° C., and the production of a fiber sheet was tried. In the comparative example, however, the resin sheet to be drawn was broken, and a fiber sheet containing stem fibers and fibril fibers was failed to be produced. Hence, any scanning electron micrograph of a sheet surface in the comparative example was not recorded, and the evaluation of greasy dirt retentivity described later was not performed.

Comparative Example 2

Figure 3B:
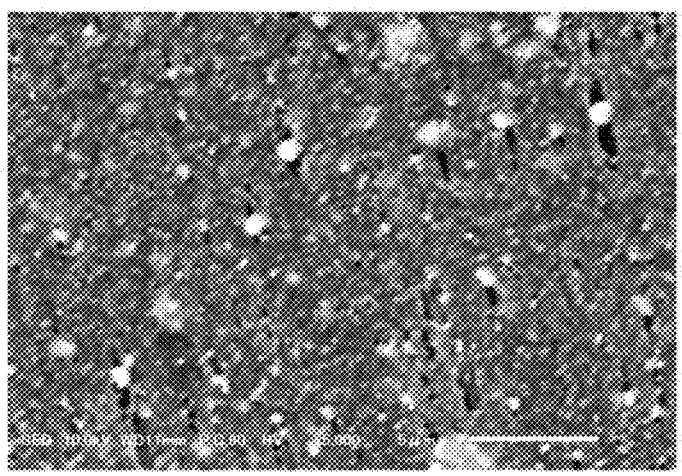

The same procedure as in Example 1 was performed except that the heating temperature in the uniaxial drawing treatment was 150° C., giving a fiber sheet. The resulting fiber sheet had a basis weight of 200 g/m², the pore volume fraction was 30%, the proportion of the number of fibers having a diameter of 500 nm or less was 0%, the pore size was 5 μm, and the cumulative pore volume was 0.2 mL/g. A scanning electron micrograph (a magnified image by a factor of 5,000) of the sheet surface in the comparative example is shown in FIG. 3(b).

Comparative Example 3

Figure 4A:
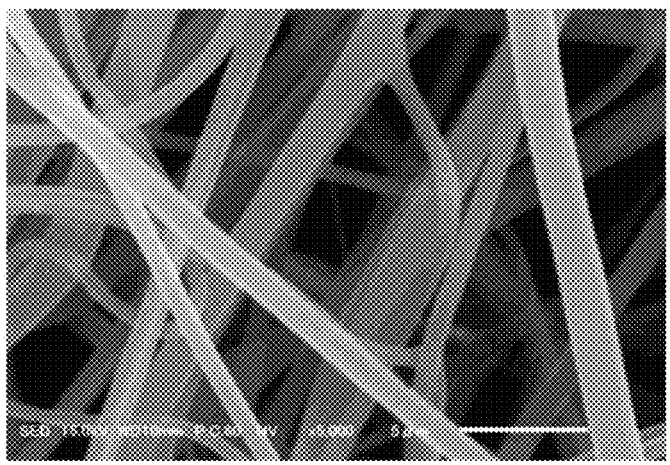
FIGS. 4(a) to 4(c) are scanning electron micrographs of sheet surfaces of fiber sheets in comparative examples.

In the comparative example, a meltblown nonwoven fabric (manufactured by TAPYRUS CO., LTD.) was used as the fiber sheet. The sheet in the comparative example had a basis weight of 100 g/m², the pore volume fraction was 95%, the proportion of the number of fibers having a diameter of 500 nm or less was 0%, the pore size was 7.1 μm, and the cumulative pore volume was 8.08 mL/g. A scanning electron micrograph (a magnified image by a factor of 5,000) of the sheet surface in the comparative example is shown in FIG. 4(a).

Comparative Example 4

Figure 4B:
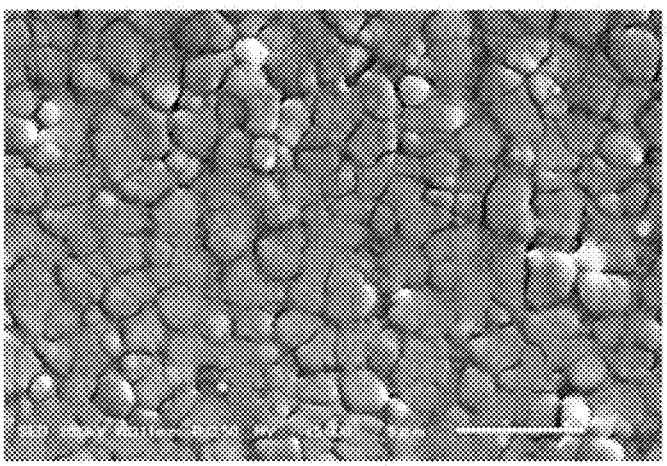

In the comparative example, a grease-absorbing film (manufactured by 3M Japan Limited) was used as the fiber sheet. The sheet in the comparative example had a basis weight of 30 g/m², the pore volume fraction was 20%, the proportion of the number of fibers having a diameter of 500 nm or less was 0%, the pore size was 0.17 and the cumulative pore volume was 0.69 mL/g. A scanning electron micrograph (a magnified image by a factor of 5,000) of the sheet surface in the comparative example is shown in FIG. 4(b).

Comparative Example 5

Figure 4C:
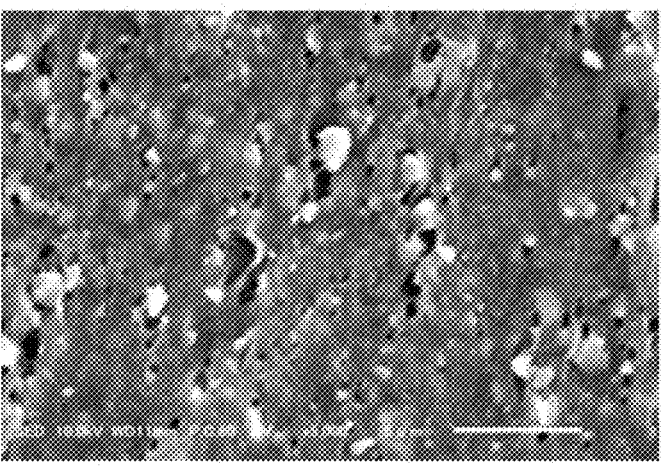

In the comparative example, a moisture permeable film (manufactured by Kao Corporation) was used as the fiber sheet. In the comparative example, the same procedure as in Example 1 was performed except that drawing treatment was performed at a heating temperature of 80° C. and a drawing factor of 1.9 times as the uniaxial drawing conditions, giving a fiber sheet. The sheet in the comparative example had a basis weight of 18 g/m², the pore volume fraction was 20%, the proportion of the number of fibers having a diameter of 500 nm or less was 0%, the pore size was 4 μm, and the cumulative pore volume was 0.52 mL/g. A scanning electron micrograph (a magnified image by a factor of 5,000) of the sheet surface in the comparative example is shown in FIG. 4(c).

[Evaluation of Greasy Dirt Adsorptivity]

Figure 5A:
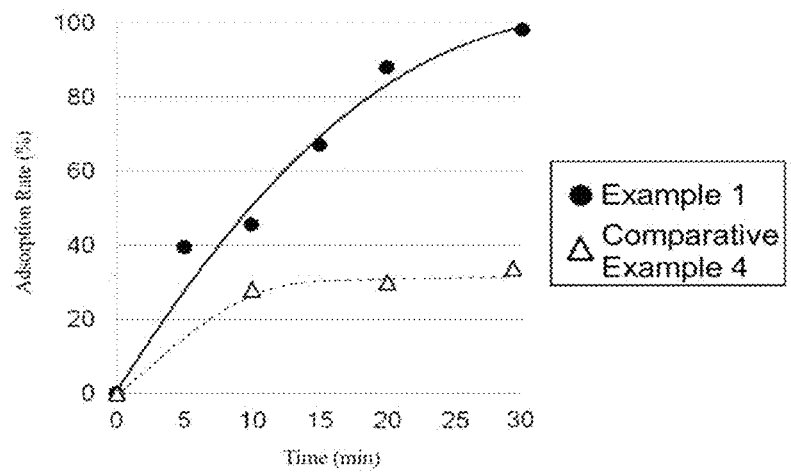
FIG. 5(a) is a graph showing the results of greasy dirt adsorptivity by fiber sheets in Example 1 and Comparative Example 4, and FIG. 5(b) includes photographs showing the states of grease-containing emulsions and fiber sheets before and after immersion of the sheets.
Figure 5B:
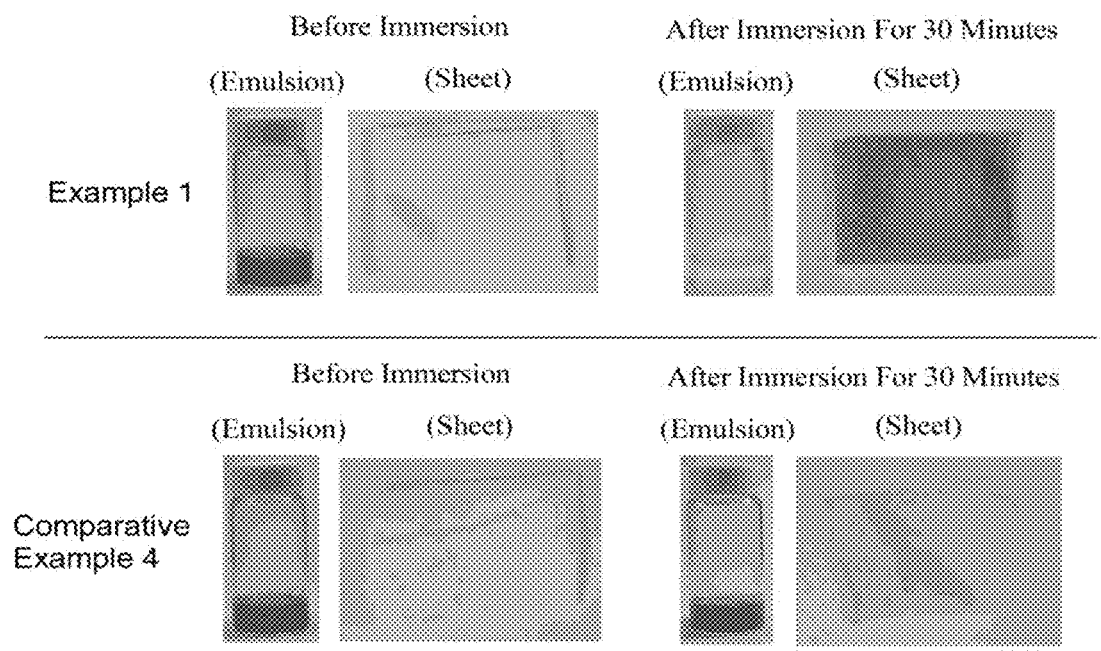

Each of the fiber sheet in Example 1 and the fiber sheet in Comparative Example 4 was immersed in an O/W model grease-containing emulsion colored in red, and the adsorption rate of the model grease was determined over time. Oleic acid was used as the model grease, and 50 mg of the oleic acid was contained in the emulsion. For the adsorption rate (%), the oleic acid adsorbed by a fiber sheet was quantitatively determined by gas chromatography, and the mass percentage of the quantitatively determined value to the mass of oleic acid contained in the emulsion was calculated as the adsorption rate (%). The changes of adsorption rate over time and the states of the emulsions and the sheets before and after the immersion are shown in FIGS. 5(a) and 5(b).

[Evaluation of Greasy Dirt Retentivity]

To each fiber sheet in Examples and Comparative Examples, 5 g of model sebum (oleic acid) as greasy dirt was adsorbed to prepare a fiber sheet with sebum. The sheet was allowed to adhere onto a surface to be cleaned without greasy dirt, then 50 g a weight was placed on the sheet, and the whole was allowed to stand for 5 seconds. The weight and the sheet were then removed, and whether the sebum adhered to the surface to be cleaned was evaluated. In the evaluation, when greasy dirt adhering to a surface to be cleaned was visually observed, such a sample was evaluated as poor retentivity (in Table 1, indicated by "poor"), whereas when no greasy dirt was visually observed, such a sample was evaluated as good retentivity (in Table 1, indicated by "good"). The results are shown in Table 1 and FIG. 6.

TABLE 1

| | Comparative Example 1 | Example 1 | Example 2 | Comparative Example 2 | Example 3 |
|---|---|---|---|---|---|
| Thermoplastic resin | Polypropylene | Polypropylene | Polypropylene | Polypropylene | Polypropylene |
| Melt flow rate (g/10 min) | 60 | 60 | 60 | 60 | 60 |
| Drawing temperature (° C.) | 120 | 130 | 140 | 150 | 130 |
| Drawing speed (mm/sec) | 5 | 5 | 5 | 5 | 5 |
| Drawing factor (times) | (broken) | 3 | 3 | 3 | 7 |
| Greasy dirt adsorptivity | Not performed due to breakage | Good | Good | Poor | Good |

| | Example 4 | Comparative Example 3 | Comparative Example 4 | Comparative Example 5 |
|---|---|---|---|---|
| Thermoplastic resin | Polyethylene | Polypropylene | Polyethylene | Polypropylene |
| Melt flow rate (g/10 min) | 2.4 | — | — | 60 |
| Drawing temperature (° C.) | 90 | — | — | 80 |
| Drawing speed (mm/sec) | 5 | — | — | 5 |
| Drawing factor (times) | 3 | — | — | 1.9 |
| Greasy dirt adsorptivity | Good | Poor | Poor | Poor |

As shown in Table 1 and FIG. 2 to FIG. 6, the fiber sheet containing fibril fibers having a small diameter and fine pores including voids among fibers in each example has excellent adsorptive retention performance and removal performance of greasy dirt such as grease and sebum as compared with the fiber sheet containing a few fibers having a small diameter and a few voids in each comparative example.

In the examples described below in which polypropylene was used as the thermoplastic resin, the formation efficiency of fibril fibers with or without the β-crystal nucleating agent as the resin crystal nucleating agent was evaluated. In FIG. 7, sign X is the uniaxial drawing direction of a resin sheet.

Example 5

The same polypropylene, zinc oxide, and silicone oil as those used in Example 1 were used and were heated and kneaded with a twin-screw extruder to give a resin composition. The resin composition in the example contained no resin crystal nucleating agent such as a β-crystal nucleating agent. The resulting resin composition was molded with a T-die extrusion molding machine to give a resin sheet. The resin sheet contained 50% by mass of the thermoplastic resin, 37% by mass of the inorganic particles, and 13% by mass of the dispersant. Next, the resulting resin sheet was uniaxially drawn at a similar drawing factor and in a similar drawing condition to those in Example 1, giving a fiber sheet having a basis weight of 200 g/m².

[Fibrillation Rate of Fiber Sheet]

Each sheet surface of the fiber sheets in Example 1 and Example 5 was observed under a scanning electron microscope at a magnification factor of 250 times, and an image data in the visual field under the scanning electron micrograph was recorded. The scanning electron micrographs of Example 5 and Example 1 are shown in FIGS. 7(a) and 7(b), respectively.

Next, the image data under the scanning electron micrograph were processed by an image processing software such as ImageJ and were binarized by brightness where the threshold level was set at the brightness boundary between a region with fibril fibers and a region without fibril fibers. Typically, when an image is binarized into white and black, the region with fibril fibers is white, and the region without fibril fibers is black. The percentage (%) of the area of a white region to the area of the visual field was calculated as the fibrillation rate. A higher fibrillation rate represents evenness of drawing and formation of fibril fibers on the whole sheet surface.

As a result, the fiber sheet containing no β-crystal nucleating agent in Example 5 included regions NA without fibril fibers and regions PA with fibril fibers as shown in FIG. 7(a). The fiber sheet in Example 5 had a fibrillation rate of 42%.

The fiber sheet containing the β-crystal nucleating agent in Example 1 included many regions PA with fibril fibers as shown in FIG. 7(b). The fiber sheet in Example 1 had a fibrillation rate of 82%.

The regions PA with fibril fibers in Examples 1 and 5 were observed under a scanning electron microscope at a magnification factor of 5,000 times, and this revealed the formation of stem fibers and fibril fibers in each example as shown in FIGS. 7(c) and 7(d).

[Evaluation of Greasy Dirt Retentivity]

The greasy dirt retentivity of the fiber sheet in Example 5 was evaluated in the same method as above. As a result, the fiber sheet in Example 5 had good greasy dirt retentivity as with Example 1, but the retainable amount of greasy dirt was small as compared with Example 1.

As described above, it has been revealed that the fiber sheet containing a β-crystal nucleating agent in Example 1 has a higher fibrillation rate than that containing no β-crystal nucleating agent in Example 5, and accordingly achieves a larger retention amount of greasy dirt. Hence, according to the present invention, by adding a β-crystal nucleating agent, a fiber sheet having a high fibrillation rate and excellent adsorptive retention performance and removal performance of greasy dirt such as grease and sebum can be easily produced.

INDUSTRIAL APPLICABILITY

According to the present invention, a fiber sheet having high adsorptive retention performance and removal performance of greasy dirt is provided.

The invention claimed is:

1. A fiber sheet, comprising:
a plurality of stem fibers comprising a thermoplastic resin and extending in one direction; and
a fibril fiber comprising substantially an identical thermoplastic resin with the thermoplastic resin, extending between the stem fibers, and having a smaller diameter than that of the stem fibers, wherein:
the plurality of stem fibers include a first stem fiber and a second stem fiber branching from the first stem fiber, and have a void between the stem fibers,
the stem fibers hold a plurality of inorganic particles,
some of the inorganic particles are exposed from the stem fibers, and
the inorganic particles are contained at a content of 10% by mass or more and 70% by mass or less.

2. The fiber sheet according to claim 1, wherein:
the fibril fiber has a fiber diameter of 250 nm or less, and
the stem fibers have a fiber diameter of more than 250 nm.

3. The fiber sheet according to claim 1, which has a pore volume fraction of 50% or more and 98% or less.

4. The fiber sheet according to claim 1, wherein the fibril fiber is formed to branch from at least one of the stem fibers.

5. The fiber sheet according to claim 1, wherein a number of fibers having a diameter of 500 nm or less is 50% or more relative to a total number of constituent fibers.

6. The fiber sheet according to claim 1, wherein the inorganic particles comprise at least one of zinc oxide, calcium carbonate, titanium oxide, and activated carbon.

7. The fiber sheet according to claim 1, wherein the inorganic particles comprise zinc oxide.

8. The fiber sheet according to claim 1, further comprising a dispersant for the inorganic particles.

9. The fiber sheet according to claim 8, wherein the dispersant is dimethylpolysiloxane.

10. The fiber sheet according to claim 1, wherein the thermoplastic resin is polypropylene and comprises a β-crystal nucleating agent for the polypropylene.

11. The fiber sheet according to claim 10, wherein the β-crystal nucleating agent is present at a content of 0.01-1 mass %.

12. The fiber sheet according to claim 1, wherein the inorganic particles have an average particle diameter of 50 nm or more and 8 μm or less.

13. The fiber sheet according to claim 1, wherein a ratio of an average particle diameter of the inorganic particles to a fiber diameter of the stem fiber is 0.1 or more and 10 or less.

14. The fiber sheet according to claim 1, wherein a ratio of an average particle diameter of the inorganic particles to a fiber diameter of the fibril fiber is 0.1 or more and 10 or less.

15. The fiber sheet according to claim 1, being used for cleaning.

16. The fiber sheet according to claim 1, wherein the inorganic particles comprise titanium oxide and are present in the fiber sheet at a concentration of 10-60 mass %.

17. The fiber sheet according to claim 1, wherein the inorganic particles comprise calcium carbonate and are present in the fiber sheet at a content of 10-60 mass %.

18. The fiber sheet according to claim 1, wherein the inorganic particles comprise zeolite and are present in the fiber sheet at a content of 10-60 mass %.

19. The fiber sheet according to claim 1, wherein the thermoplastic resin is polyethylene and comprises a β-crystal nucleating agent for the polyethylene.

20. The fiber sheet according to claim 8, wherein the dispersant is at least one selected from the group consisting of a silicone oil, a fatty acid, a maleic acid-modified polypropylene, and a maleic acid-modified polyethylene.

* * * * *